US012719261B2

(12) United States Patent
Piques et al.

(10) Patent No.: US 12,719,261 B2
(45) Date of Patent: Aug. 25, 2026

(54) ELECTRONIC CONTROL UNIT FOR VEHICLE WITH INTEGRATED CUT-OFF

(71) Applicant: Continental Automotive Technologies GmbH, Hannover (DE)

(72) Inventors: Nicolas Piques, Ramonville Saint Agne (FR); Philippe Laurine, Toulouse (FR); Jean-Marc Tornare, Colomiers (FR)

(73) Assignee: Continental Automotive Technologies GmbH, Hannover (DE)

( * ) Notice: Subject to any disclaimer, the term of this patent is extended or adjusted under 35 U.S.C. 154(b) by 192 days.

(21) Appl. No.: 18/716,175

(22) PCT Filed: Dec. 15, 2022

(86) PCT No.: PCT/EP2022/086225

§ 371 (c)(1),
(2) Date: Jun. 4, 2024

(87) PCT Pub. No.: WO2023/117711

PCT Pub. Date: Jun. 29, 2023

(65) Prior Publication Data

US 2025/0038521 A1 Jan. 30, 2025

(30) Foreign Application Priority Data

Dec. 20, 2021 (FR) ........................................ 2114028

(51) Int. Cl.
*H02H 7/18* (2006.01)
*B60R 16/033* (2006.01)

(52) U.S. Cl.
CPC ............. *H02H 7/18* (2013.01); *B60R 16/033* (2013.01)

(58) Field of Classification Search
CPC ........ B60R 16/03; B60R 16/033; H02H 1/06; H02H 3/023; H02H 3/202; H02H 7/1213; H02H 7/18
USPC .......................................................... 361/93.1
See application file for complete search history.

(56) References Cited

U.S. PATENT DOCUMENTS

2003/0032308 A1 2/2003 Tamai et al.
2003/0137285 A1* 7/2003 Tamai ........................ G06F 1/26 323/266
2015/0364286 A1 12/2015 Kang et al.

FOREIGN PATENT DOCUMENTS

EP 148370 A1 * 7/1985
EP 3893349 A1 * 10/2021 .............. H02J 3/381
FR 2870996 A1 12/2005

OTHER PUBLICATIONS

French Search Report issued in corresponding Patent Application No. FR 2114028 dated Aug. 5, 2022, 12 pages.

(Continued)

*Primary Examiner* — Kevin J Comber
(74) *Attorney, Agent, or Firm* — Buchanan Ingersoll & Rooney PC

(57) ABSTRACT

A disconnection module for an electronic control unit of a motor vehicle. The electronic control unit includes a disconnection module configured to be electrically connected to at least one electrical link, to determine the difference between the voltage measured on the at least one electrical link and a reference voltage and to command the triggering of electrical safety members when the determined voltage difference is greater than a predetermined breakdown threshold.

10 Claims, 2 Drawing Sheets

(56) References Cited

OTHER PUBLICATIONS

International Search Report (PCT/ISA/210) with English translation and Written Opinion (PCT/ISA/237) mailed on Apr. 13, 2023, by the European Patent Office as the International Searching Authority for International Application No. PCT/EP2022/086225, 17 pages.

* cited by examiner 1
10
216
216
210
210
20
215
215
30
220
225
240
230
235
M

ELECTRONIC CONTROL UNIT FOR VEHICLE WITH INTEGRATED CUT-OFF

CROSS REFERENCE TO RELATED APPLICATIONS

This application is the U.S. National Phase Application of PCT International Application No. PCT/EP2022/086225, Dec. 15, 2022, which claims priority to French Patent Application No. 2114028, filed Dec. 20, 2021, the contents of such applications being incorporated by reference herein.

Field of the Invention

The invention relates to the technical field of motor vehicles and more particularly concerns an electronic control unit and a method for electrical protection of such a unit.

BACKGROUND OF THE INVENTION

In a motor vehicle, it is known to use electronic control units to control certain functions of the vehicle. In this respect, it is known to use one or more electronic control units to control the engine or engines of the vehicle or to control electrical elements, for example of the passenger compartment of the vehicle, in particular via their electrical power supply.

In certain cases, an electronic control unit comprises electrical elements which are powered by a voltage of the order of 12 V, such as for example electrical relays controlling the bulbs of the headlights or the windshield wipers, and electrical elements which are powered with a voltage of the order of 1 V to 5 V, such as for example a microcontroller or any other electronic component. The electronic control unit is powered by a battery of the vehicle delivering a voltage of the order of 12 V. The electronic control unit uses this battery voltage to power the electrical elements which are powered by 12 V and regulates this battery voltage to a voltage of the order of 1 to 5 V to power the electrical elements which are powered by 1 to 5 V.

Electrically, the electrical elements of the electronic control unit which are powered by 12 V may be grouped together in a so-called "high-voltage" block and the electrical elements of the electronic control unit which are powered by 1 to 5 V may be grouped together in a so-called "low-voltage" block. As is known, these two blocks are connected by an electrical link allowing the high-voltage block to provide the low-voltage block with a current defining the regulated low voltage of 1 to 5 V in order to electrically power the low-voltage electrical elements. The high-voltage block and the low-voltage block may be connected by additional electrical links such as, for example, another electrical power supply link, a data communication link, a link for controlling the low-voltage electrical elements, etc.

In this type of architecture, a short circuit to the battery voltage may occur via the high-voltage block on one of the electrical links, thus delivering a voltage of the order of 12 V to the low-voltage block, which may cause the electronic control unit to heat up in the region of said low-voltage block. However, such heating-up may spread to the outside of the electronic control unit and thus present a fire hazard which would endanger the occupants of the vehicle.

In order to at least partially overcome these drawbacks, it is known to equip the electronic control unit with a casing made of metal or of any other fire-resistant material. However, such a casing simultaneously increases the volume, the manufacturing complexity and the cost of the electronic control unit, which turns out to be a major drawback in the field of motor vehicles.

There is therefore the need for a solution which makes it possible to at least partially overcome these drawbacks.

SUMMARY OF THE INVENTION

One of the aims of an aspect of the present invention is to provide a simple, safe and inexpensive solution for an electronic control unit. Another aim of an aspect of the invention is to reduce or even to eliminate any fire hazard related to a short circuit to the battery voltage of an electrical link connecting the high-voltage block and the low-voltage block.

To this end, an aspect of the invention is firstly a disconnection module for an electronic control unit of a motor vehicle, said electronic control unit comprising:

- at least one power supply input designed to receive a voltage of between 10 and 15 V from an electrical power supply battery of the vehicle,
- a so-called "high-voltage" block comprising a plurality of so-called "high-voltage" electrical elements which are configured to be powered by said battery voltage via at least one high-voltage power supply line, each high-voltage power supply line comprising an electrical safety member designed to open said high-voltage power supply line when the voltage across its terminals exceeds a predetermined safety threshold, said high-voltage block being configured to convert the battery voltage into at least one regulated low voltage of between 1 and 5 V,
- a so-called "low-voltage" block comprising a plurality of so-called "low-voltage" electrical elements which are configured to be powered by the at least one regulated low voltage delivered by the high-voltage block on at least one electrical link connecting the high-voltage block and said low-voltage block, the disconnection module being configured to be electrically connected to the at least one electrical link, to determine the difference between the voltage measured on the at least one electrical link and a reference voltage and to command the triggering of the electrical safety members when the determined voltage difference is greater than a predetermined breakdown threshold.

The disconnection module according to an aspect of the invention thus makes it possible to open the electrical link between the power supply input or inputs and the high-voltage block when a risk of overvoltage of the low-voltage block appears between the high-voltage block and the low-voltage block, thus avoiding damage to the electrical elements of the low-voltage block and therefore to the electronic control unit. The disconnection module according to an aspect of the invention thus makes it possible to avoid the use of a large fire-resistant casing which is complex to manufacture and which would increase the price of the electronic control unit.

Advantageously, the disconnection module is configured to command the triggering of all the electrical safety members when the determined voltage difference is greater than a predetermined breakdown threshold in order to electrically disconnect all the power supply inputs from the high-voltage block. The electronic control unit is thus totally disconnected from the power supply battery in this case.

In one embodiment, the disconnection module comprises at least one switch configured to be electrically connected, on the one hand, to the at least one high-voltage power supply line, between the electrical safety member and the high-voltage block, and, on the other hand, to a ground, and a comparator configured to receive the voltage from the at least one electrical link at an input, to compare said voltage with the reference voltage and to provide, as output, a control voltage for closing the at least one switch. The use of a comparator and of one or more switches makes it possible to detect a surge in voltage on the electrical link or links between the high-voltage block and the low-voltage block in a simple and effective manner.

Advantageously, the disconnection module comprises a locking circuit comprising an autonomous power supply to keep the at least one switch closed at least for a predetermined duration when the at least one switch is no longer powered by the output voltage of the comparator.

Preferably, the autonomous power supply is a capacitor or a battery.

According to one aspect of the invention, when the autonomous power supply is a capacitor, the value of energy stored in the capacitor is chosen so as to allow the at least one switch to be kept closed for a duration greater than the breakdown duration of the at least one electrical safety member.

Advantageously, the locking circuit comprises at least one transistor configured to receive the control voltage as output from the comparator and to command the closure of the at least one switch on the basis of the voltage provided by the autonomous power supply.

An aspect of the invention also concerns an electronic control unit for a motor vehicle, said electronic control unit comprising:

- at least one power supply input designed to receive a voltage of between 10 and 15 V from an electrical power supply battery,
- a so-called "high-voltage" block comprising a plurality of so-called "high-voltage" electrical elements which are configured to be powered by said battery voltage via at least one high-voltage power supply line, each high-voltage power supply line comprising an electrical safety member designed to open the high-voltage power supply line when the intensity of the current across its terminals exceeds a predetermined safety threshold, said high-voltage block being configured to convert the battery voltage into at least one regulated low voltage of between 1 and 5 V,
- a so-called "low-voltage" block comprising a plurality of so-called "low-voltage" electrical elements which are configured to be powered by the at least one regulated low voltage delivered by the high-voltage block on at least one electrical link connecting the high-voltage block and said low-voltage block,
- at least one disconnection module as presented previously.

An aspect of the invention also concerns an electrical system comprising an electronic control unit as presented previously and at least one disconnection module, as presented hereinabove, which is connected, on the one hand, to the at least one electrical link and, on the other hand, to the at least one high-voltage power supply line.

Preferably, the electrical safety members are of fuse, dogbone or jumper type.

The fuse may be of any type, fast or slow, in order to open the circuit when the current exceeds a few amperes, for example 5 or 6 A, so as to protect the delicate low-voltage electronic components. For example, the fuse may be of jumper fuse type, for example having a resistance of 0 ohms, to reduce the costs.

According to one aspect of the invention, the electronic control unit comprises a printed circuit board on which the electrical elements are mounted, the fuse is a surface-mount component on said printed circuit board, in particular of the 0402 package surface-mount component type.

An aspect of the invention also concerns a motor vehicle comprising an electrical power supply battery, an electronic control unit as presented hereinabove or a system as presented hereinabove, where the electronic control unit is electrically connected to said electrical power supply battery via the at least one power supply input.

An aspect of the invention also concerns a method for keeping safe an electronic control unit as presented hereinabove or an electronic control unit of a system as presented hereinabove, said method, implemented by the at least one disconnection module when said electronic control unit is powered by a voltage received from the electrical power supply battery of the vehicle, comprising a step of determining the difference between the voltage measured on at least one electrical link of the electronic control unit and a reference voltage and a step of triggering the electrical safety members of the electronic control unit in order to electrically disconnect the at least one power supply input from the high-voltage block of the electronic control unit when the determined voltage difference is greater than a predetermined breakdown threshold.

BRIEF DESCRIPTION OF THE DRAWINGS

Other features and advantages of aspects of the invention will become more clearly apparent on reading the following description. This description is purely illustrative and should be read with reference to the appended drawings, in which.

DETAILED DESCRIPTION OF EXEMPLARY EMBODIMENTS

Figures 1, 2:
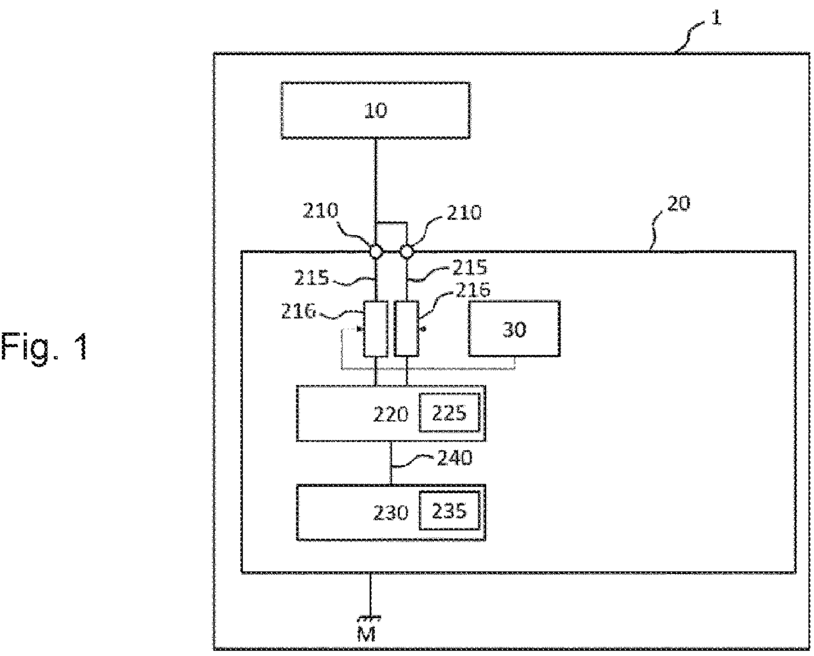
FIG. 1 schematically illustrates a first embodiment of the vehicle according to the invention.
FIG. 2 schematically illustrates a second embodiment of the vehicle according to the invention.

FIG. 1 shows one embodiment of the motor vehicle 1 according to the invention. In this example, the vehicle 1 comprises an electrical power supply battery 10, an electronic control unit 20 and at least one disconnection module 30 according to the invention.

In a first embodiment, illustrated in FIG. 1, the disconnection module 30 and the electrical safety members 216 are inside the electronic control unit 20. In other words, the electronic control unit 20 comprises the disconnection module 30.

In a second embodiment, illustrated in FIG. 2, the disconnection module 30 is inside the electronic control unit 20 and the electrical safety members 216 are situated outside the electronic control unit 20 between the electrical power supply battery 10 and each power supply input 210.

In a third embodiment (not illustrated), some of the functions of the disconnection module 30 could be implemented in the electronic control unit 20 and the other functions could be implemented outside the electronic control unit 20. For example, the disconnection module 30 is outside the electronic control unit 20. In other words, the electronic control unit 20 and the disconnection module 30 could be two distinct physical entities so that the disconnection module 30 is outside the electronic control unit 20.

The electrical power supply battery 10 is an electrical power supply module allowing the storage and the recovery of electrical energy in order to power, in particular, high-voltage electrical elements 225 of the electronic control unit 20. The electrical power supply battery 10 may for example be of lithium-ion type and in this example delivers a voltage of between 10 and 15 V, preferably of the order of 12 V to 13 V.

The electronic control unit 20 comprises at least one power supply input 210, a so-called "high-voltage" block 220, a so-called "low-voltage" block 230 and at least one electrical link 240 connecting said high-voltage block 220 and said low-voltage block 230.

Each power supply input 210 is designed to receive a voltage from the electrical power supply battery 10 and is electrically connected to the high-voltage block 220 by a high-voltage power supply line 215.

In the examples of the figures, the electronic control unit 20 comprises two power supply inputs 210 and two high-voltage power supply lines 215 without this limiting the scope of an aspect of the invention. In other words, in another embodiment, the electronic control unit 20 could comprise a single power supply input 210 and a single high-voltage power supply line 215 or more than two power supply inputs 210 and as many high-voltage power supply lines 215.

In the example of FIG. 1, each high-voltage power supply line 215 comprises an electrical safety member 216 designed to open said high-voltage power supply line 215 when the intensity of the current across its terminals exceeds a predetermined safety threshold. In the example of FIG. 2, the electrical safety members 216 are situated outside the electronic control unit 20 and each electrical safety member 216 is mounted on an electrical line connecting the electrical power supply battery 10 to one of the power supply inputs 210.

The electrical safety members 216 may be of the fuse, dogbone or jumper type or any suitable means of electrical cut-off. The fuse may be of any type, fast or slow, in order to open the high-voltage power supply line 215 when the current exceeds a few amperes, for example 5 or 6 A, so as to protect the delicate electronic components of the low-voltage block 230. For example, the fuse may be of jumper fuse type, for example having a resistance of 0 ohms, to reduce the costs. When the electronic control unit 20 comprises a printed circuit board on which the electrical elements of the high-voltage block 220 and of the low-voltage block 230 are mounted, the fuse may be a surface-mount component on said printed circuit board, in particular of the 0402 package surface-mount component type.

The high-voltage block 220 comprises so-called "high-voltage" electrical elements 225. The high-voltage electrical elements 225 are electrical elements which are powered at the voltage provided by the electrical power supply battery 10 such as, for example, electrical relays or power electronic components controlling the bulbs of the headlights or the windshield wipers.

The high-voltage block 220 is configured to convert the voltage provided by the electrical power supply battery 10, received at the power supply input 210, into a so-called regulated "low" voltage of lower value, preferably of between 1 V and 5 V.

The high-voltage block 220 may be configured to control the high-voltage electrical elements, in particular by powering them on the basis of the voltage provided by the electrical power supply battery 10 and received at the power supply input 210, or low-voltage electrical elements of the low-voltage block 230 via the at least one electrical link 240.

A plurality of electrical links may connect the high-voltage block 220 and the low-voltage block 230. At minimum, one electrical power supply link 240 is provided for allowing the low-voltage electrical elements to be supplied with power by the low voltage regulated by the high-voltage block 220. In addition, the electronic control unit 20 may comprise one or more links other electrical links of control type, allowing the high-voltage electrical elements 225 to control the low-voltage electrical elements 235, and/or of unidirectional or bidirectional data communication type, for exchanging data between the high-voltage electrical elements 225 and the low-voltage electrical elements 235.

The low-voltage block 230 comprises so-called "low-voltage" electrical elements 235. The low-voltage electrical elements 235 are electrical elements which are powered with a voltage of the order of 1 V to 5 V, such as for example a microcontroller or electronic components, for example of the dashboard.

The low-voltage block 230 may be configured to control the low-voltage electrical elements 235 by powering them on the basis of the low voltage provided by the high-voltage block 220.

In the examples of the figures, the electronic control unit 20 comprises a single connection module without this limiting the scope of an aspect of the present invention.

The disconnection module 30 is connected to at least one of the electrical links 240, for example the electrical power supply link, or even to all the electrical links 240 connecting the high-voltage block 220 and the low-voltage block 230.

The disconnection module 30 is configured to determine the difference Δ between the voltage measured on the electrical link or links 240 and a reference voltage Vref.

The disconnection module 30 is configured to command the triggering of the electrical safety members 216 when the determined voltage difference Δ is greater than a predetermined breakdown threshold in order to open the high-voltage power supply lines 215 and thus electrically disconnect the power supply inputs 210 from the high-voltage block 220.

Figure 4:
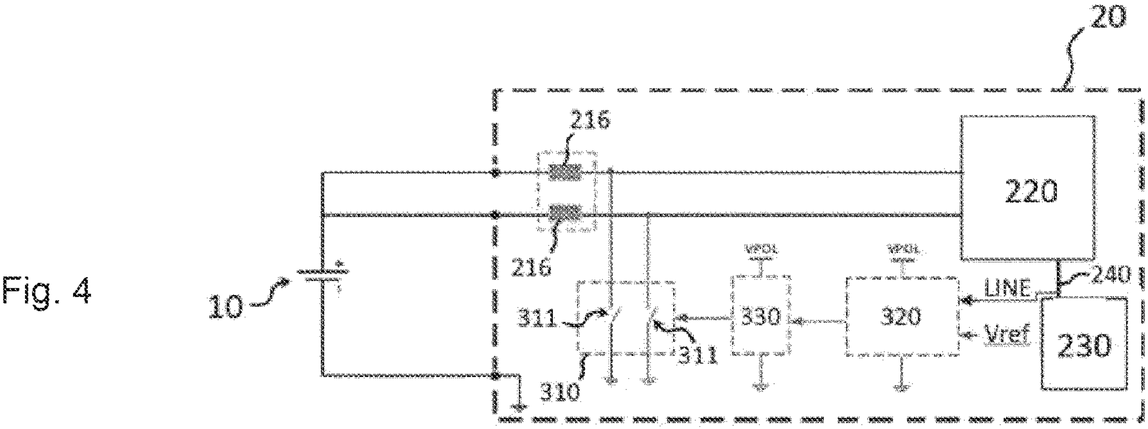
FIG. 4 illustrates an example of a block circuit diagram of the electronic control unit of FIG. 1.

FIG. 4 illustrates a working example of an electronic control unit 20. In this example, the disconnection module 30 comprises a commutation module 310, a comparator 320 and a locking circuit 330.

Figure 5:
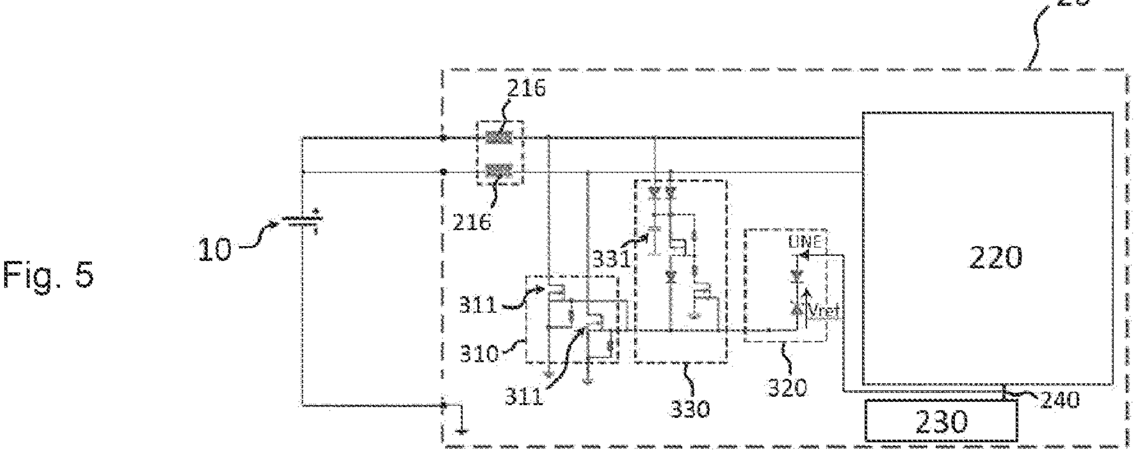
FIG. 5 illustrates one embodiment of the electronic control unit of FIG. 4.

The commutation module 310 comprises two switches 311. Each switch 311 is connected, on the one hand, to one of the two high-voltage power supply lines 215 and, on the other hand, to the ground M and receives the output voltage of the comparator 320. In the example of FIG. 5, each switch 311 is in the form of a transistor, as is known per se.

The comparator 320 is configured to receive at one input the voltage LINE from the electrical link 240 in order to compare it with the reference voltage Vref and to provide, as output, a control voltage for closing the switches 310. In the example of FIG. 5, the comparator 320 comprises a conducting diode and a Zener diode, defining across its terminals the reference voltage Vref, in order to compare the voltage LINE from the electrical link 240 and said reference voltage Vref, as is known per se.

The locking circuit 330 is connected between the high-voltage power supply lines 215 and the line connecting the output of the comparator 320 and the switches 311. The locking circuit 330 comprises an autonomous power supply in the form of a capacitor 331 in the example of FIG. 5. The value of energy stored in the capacitor 331 is chosen so as to allow the switches to be kept closed for a duration greater than the breakdown duration of the electrical safety members 216. In the case of the capacitor 331, the voltage Vpol of FIG. 4 is measured between the high-voltage power supply line 215 and the reference ground.

As a variant, the autonomous power supply could be a battery or any suitable embedded source of electrical energy. In the case of a battery, it is not necessary to connect the locking circuit 330 to the high-voltage power supply lines 215. In the case of a battery, the voltage Vpol of FIG. 4 corresponds to the voltage defined across the terminals of the battery.

In the embodiment illustrated in FIG. 5, the locking circuit 330 comprises, in addition to the capacitor 331, two transistors and two resistors connected between the high-voltage power supply lines 215 and the line connecting the output of the comparator 320 to the switches 311 in order to lock the closure of the switches 311 for a sufficiently long time to ensure the opening of the high-voltage power supply lines 215 by the electrical safety members 216. The locking circuit 330 also comprises diodes making it possible, in particular, to power the locking circuit 330 by two distinct high-voltage power supply lines 215. The locking circuit 330 also comprises diodes allowing a redundancy of the power supply of the locking circuit 330 to ensure that the protection functions correctly in the event of a double failure. For example, in the event of the loss of one of the connections between the electrical power supply battery 10 and the electronic control unit 20 (first failure) and connection between the high-voltage block 220 and the low-voltage block 230 (second failure), the locking circuit 330 remains powered and will play its role in keeping the switches closed.

Figure 3:
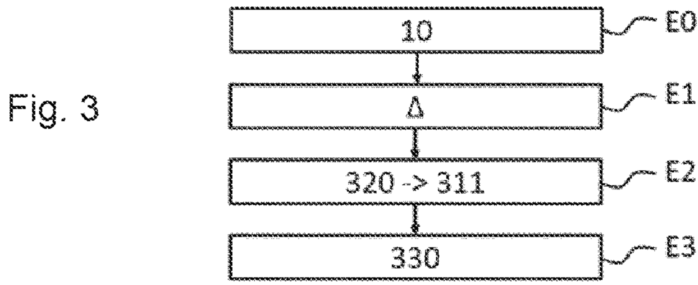
FIG. 3 schematically illustrates one embodiment of the method according to the invention.

FIG. 3 shows one embodiment of the method according to the invention.

The terms "voltage from the link . . . " and "reference voltage" are understood to mean the voltage measured between the link and a ground M or between the reference voltage and said ground M, respectively.

As a prerequisite, the electronic control unit 20 is powered in a preliminary step E0 by the voltage received from the electrical power supply battery 10 of the vehicle 1 at the power supply inputs 210.

Once the electronic control unit 20 is being powered by the voltage from the battery 10, the comparator 320 of the disconnection module 30 determines, in a step E1, the difference Δ between the voltage measured on the electrical link 240 and the reference voltage Vref, that is to say compares the voltage measured on the electrical link 240 and the reference voltage Vref.

When the determined voltage difference Δ is greater than the predetermined breakdown threshold, the output of the comparator 320 commands the switches 311 to close in a step E2 in order to make a current flow through the electrical safety members 216 to trigger them, for example to make the fuses blow when the electrical safety members 216 are fuses, so as to open the high-voltage power supply lines 215 and thus electrically disconnect the power supply inputs 210 from the high-voltage block 220 to avoid causing damage to the electronic control unit 20.

The locking circuit 330 allows the control current for closing the switches 311 to be kept for a sufficient period of time (step E3) irrespective of the value of the voltage from the electrical link 240 and the reference voltage Vref in order to ensure the triggering of the electrical safety members 216 even if the determined voltage difference Δ becomes lower than the predetermined breakdown threshold again and to thus ensure that damage to the low-voltage block 230 is avoided.

The invention therefore makes it possible to avoid causing damage to the low-voltage block 230 by disconnecting the electronic control unit 20 from the battery 10 when an overvoltage occurs between the high-voltage block 220 and the low-voltage block 230.

The invention claimed is:

1. A disconnection module for an electronic control unit of a motor vehicle, said electronic control unit comprising:

at least one power supply input designed to receive a voltage of between 10 and 15 V from an electrical power supply battery, a so-called "high-voltage" block comprising a plurality of so-called "high-voltage" electrical elements which are configured to be powered by said battery voltage via at least one high-voltage power supply line, each high-voltage power supply line comprising an electrical safety member designed to open said high-voltage power supply line when the voltage across its terminals exceeds a predetermined safety threshold, said high-voltage block being configured to convert the battery voltage into at least one regulated low voltage of between 1 and 5 V, a so-called "low-voltage" block comprising a plurality of so-called "low-voltage" electrical elements which are configured to be powered by the at least one regulated low voltage delivered by the high-voltage block on at least one electrical link connecting the high-voltage block and said low-voltage block, the disconnection module being configured to be electrically connected to the at least one electrical link, to determine a difference (Δ) between the voltage measured on the at least one electrical link and a reference voltage (Vref) and to command the triggering of the electrical safety members when the determined voltage difference is greater than a predetermined breakdown threshold, at least one switch configured to be electrically connected, on the one hand, to the at least one high-voltage power supply line, between the electrical safety member and the high-voltage block, and, on the other hand, to a ground, a comparator configured to receive the voltage from the at least one electrical link at an input, to compare said voltage with the reference voltage and to provide, as output, a control voltage for closing the at least one switch, and a locking circuit comprising an autonomous power supply to keep the at least one switch closed at least for a predetermined duration when the at least one switch is no longer powered by the output voltage of the comparator.

2. The disconnection module as claimed in claim 1, wherein the autonomous power supply is a capacitor or a battery.

3. The disconnection module as claimed in claim 2, wherein, when the autonomous power supply is a capacitor, the value of energy stored in the capacitor is chosen so as to allow the at least one switch to be kept closed for a duration greater than the breakdown duration of the at least one electrical safety member.

4. The disconnection module as claimed in claim 1, wherein the locking circuit comprises at least one transistor configured to receive the control voltage as output from the comparator and to command the closure of the at least one switch on the basis of the voltage provided by the autonomous power supply.

5. An electronic control unit for a motor vehicle, said electronic control unit comprising:

at least one power supply input designed to receive a voltage of between 10 and 15 V from an electrical power supply battery, a so-called "high-voltage" block comprising a plurality of so-called "high-voltage" electrical elements which are configured to be powered by said battery voltage via at least one high-voltage power supply line, each high-voltage power supply line comprising an electrical safety member designed to open the high-voltage power supply line when the intensity of the current across its terminals exceeds a predetermined safety threshold, said high-voltage block being configured to convert the battery voltage into at least one regulated low voltage of between 1 and 5 V, a so-called "low-voltage" block comprising a plurality of so-called "low-voltage" electrical elements which are configured to be powered by the at least one regulated low voltage delivered by the high-voltage block on at least one electrical link connecting the high-voltage block and said low-voltage block, and at least one disconnection module as claimed in claim 1.

6. An electrical system comprising an electronic control unit as claimed in claim 5 and at least one disconnection module for said electronic control unit of a motor vehicle, said electronic control unit comprising:

at least one power supply input designed to receive a voltage of between 10 and 15 V from an electrical power supply battery, a so-called "high-voltage" block comprising a plurality of so-called "high-voltage" electrical elements which are configured to be powered by said battery voltage via at least one high-voltage power supply line, each high-voltage power supply line comprising an electrical safety member designed to open said high-voltage power supply line when the voltage across its terminals exceeds a predetermined safety threshold, said high-voltage block being configured to convert the battery voltage into at least one regulated low voltage of between 1 and 5 V, a so-called "low-voltage" block comprising a plurality of so-called "low-voltage" electrical elements which are configured to be powered by the at least one regulated low voltage delivered by the high-voltage block on at least one electrical link connecting the high-voltage block and said low-voltage block, and the disconnection module being configured to be electrically connected to the at least one electrical link, to determine a difference between the voltage measured on the at least one electrical link and a reference voltage and to command the triggering of the electrical safety members when the determined voltage difference is greater than a predetermined breakdown threshold wherein the at least one disconnection module is connected, on the one hand, to the at least one electrical link and, on the other hand, to the at least one high-voltage power supply line.

7. A motor vehicle comprising an electrical power supply battery, a system as claimed in claim 6, where the electronic control unit is electrically connected to said electrical power supply battery via the at least one power supply input.

8. A method for keeping safe a system as claimed in claim 6, said method, implemented by the at least one disconnection module when said electronic control unit is powered by a voltage received from the electrical power supply battery of the vehicle, the method comprising:

determining a difference between the voltage measured on at least one electrical link of the electronic control unit and a reference voltage and triggering the electrical safety members of the electronic control unit in order to electrically disconnect the at least one power supply input from the high-voltage block of the electronic control unit when the determined voltage difference is greater than a predetermined breakdown threshold.

9. A motor vehicle comprising an electrical power supply battery, an electronic control unit as claimed in claim 5, where the electronic control unit is electrically connected to said electrical power supply battery via the at least one power supply input.

10. A method for keeping safe an electronic control unit as claimed in claim 5, said method, implemented by the at least one disconnection module when said electronic control unit is powered by a voltage received from the electrical power supply battery of the vehicle, comprising determining a difference between the voltage measured on at least one electrical link of the electronic control unit and a reference voltage and triggering the electrical safety members of the electronic control unit in order to electrically disconnect the at least one power supply input from the high-voltage block of the electronic control unit when the determined voltage difference is greater than a predetermined breakdown threshold.

* * * * *